US009521275B2

(12) United States Patent
Kowaka

(10) Patent No.: US 9,521,275 B2
(45) Date of Patent: Dec. 13, 2016

(54) ELECTRONIC DEVICE AND RECORDING MEDIUM THAT SUPPORT OPERATION OF USERS

(71) Applicant: KYOCERA Document Solutions Inc., Osaka (JP)

(72) Inventor: Makoto Kowaka, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 14/953,333

(22) Filed: Nov. 28, 2015

(65) Prior Publication Data

US 2016/0156792 A1 Jun. 2, 2016

(30) Foreign Application Priority Data

Nov. 28, 2014 (JP) ................................ 2014-241780

(51) Int. Cl.

*H04N 1/00* (2006.01)
*G06F 3/12* (2006.01)
*G05B 15/02* (2006.01)

(52) U.S. Cl.

CPC .......... *H04N 1/00244* (2013.01); *G05B 15/02* (2013.01); *G06F 3/1204* (2013.01); *G06F 3/1238* (2013.01); *G06F 3/1273* (2013.01); *H04N 2201/0094* (2013.01)

(58) Field of Classification Search

CPC .................. H04N 1/00244; H04N 2201/0094; G05B 15/02; G06F 3/1204; G06F 3/1238; G06F 3/1273

USPC ................................................ 358/1.13, 1.15

See application file for complete search history.

(56) References Cited

U.S. PATENT DOCUMENTS 7,861,282 B2 * 12/2010 Kakigi .................. G06F 21/608 726/1
8,547,564 B2 * 10/2013 Ito ...................... G03G 15/5004 358/1.13
2006/0143286 A1 * 6/2006 Aoki .................. H04N 1/00209 709/220
2010/0149575 A1 * 6/2010 Ozawa .................. G06F 3/1203 358/1.13
2013/0208292 A1 * 8/2013 Akari ...................... G06F 3/121 358/1.13
2013/0335765 A1 12/2013 Ishiguro
2015/0103368 A1 * 4/2015 Fukushima ........ H04N 1/00222 358/1.13

FOREIGN PATENT DOCUMENTS

JP 2007-148505 A 6/2007
JP 2009-188590 A 8/2009
JP 2014-003413 A 1/2014

* cited by examiner

*Primary Examiner* — Allen H Nguyen

(74) *Attorney, Agent, or Firm* — Hawaii Patent Services; Nathaniel K. Fedde; Kenton N. Fedde

(57) ABSTRACT

Provided is an electronic device including a user operation procedure storage processing part and a user operation procedure re-executing part. The user operation procedure storage processing part stores, for each user, a time and a procedure of operation performed by a user. The user operation procedure re-executing part re-executes the operation started at the operation time by the user identified by the user identification information based on user identification information and the operation time.

6 Claims, 5 Drawing Sheets

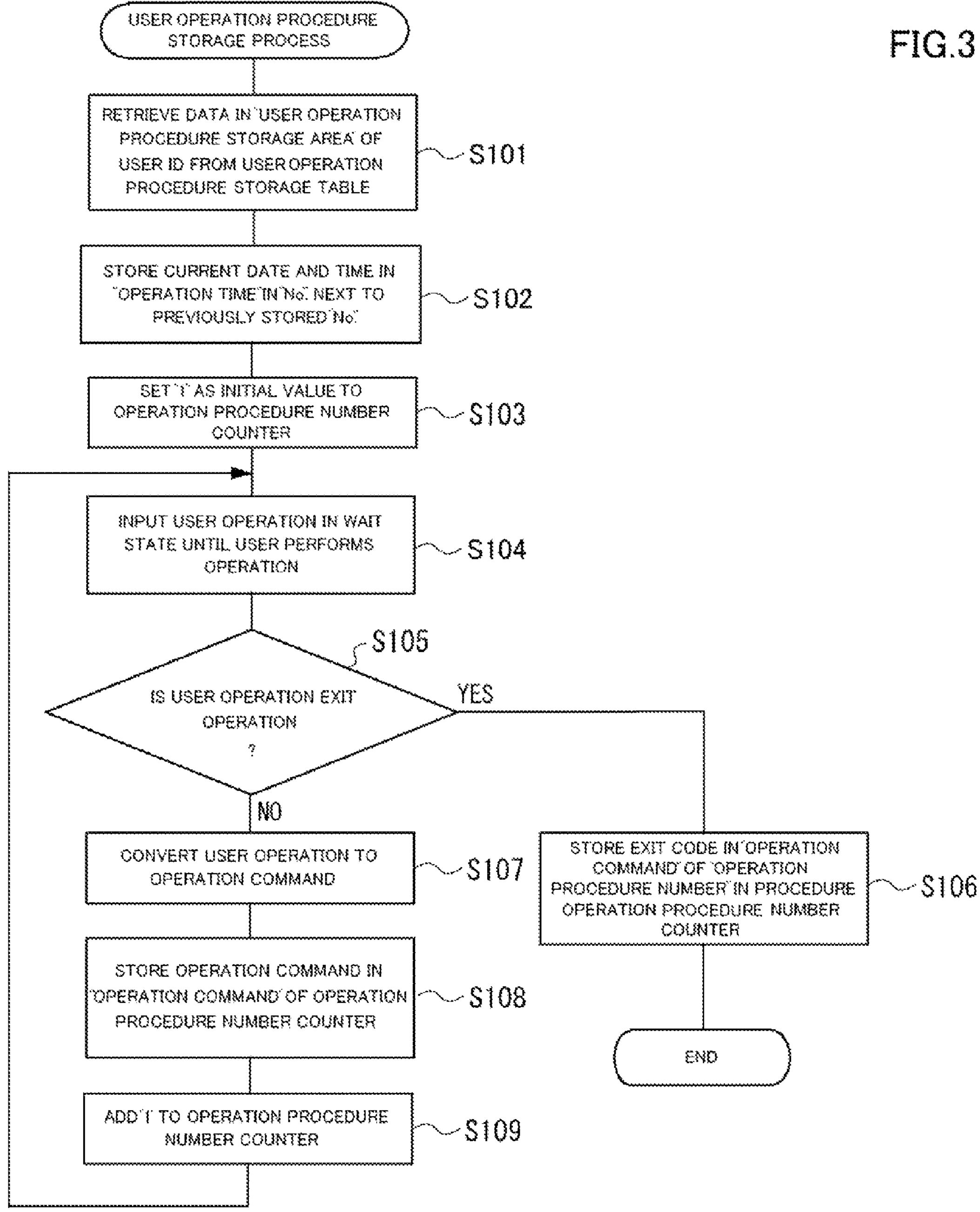

FIG.3
USER OPERATION PROCEDURE STORAGE PROCESS
RETRIEVE DATA IN "USER OPERATION PROCEDURE STORAGE AREA" OF USER ID FROM USER OPERATION PROCEDURE STORAGE TABLE
S101
STORE CURRENT DATE AND TIME IN "OPERATION TIME" IN "No." NEXT TO PREVIOUSLY STORED "No."
S102
SET "1" AS INITIAL VALUE TO OPERATION PROCEDURE NUMBER COUNTER
S103
INPUT USER OPERATION IN WAIT STATE UNTIL USER PERFORMS OPERATION
S104
S105
IS USER OPERATION EXIT OPERATION ?
YES
NO
CONVERT USER OPERATION TO OPERATION COMMAND
S107
STORE OPERATION COMMAND IN "OPERATION COMMAND" OF OPERATION PROCEDURE NUMBER COUNTER
S108
ADD "1" TO OPERATION PROCEDURE NUMBER COUNTER
S109
STORE EXIT CODE IN "OPERATION COMMAND" OF "OPERATION PROCEDURE NUMBER" IN PROCEDURE OPERATION PROCEDURE NUMBER COUNTER
S106
END

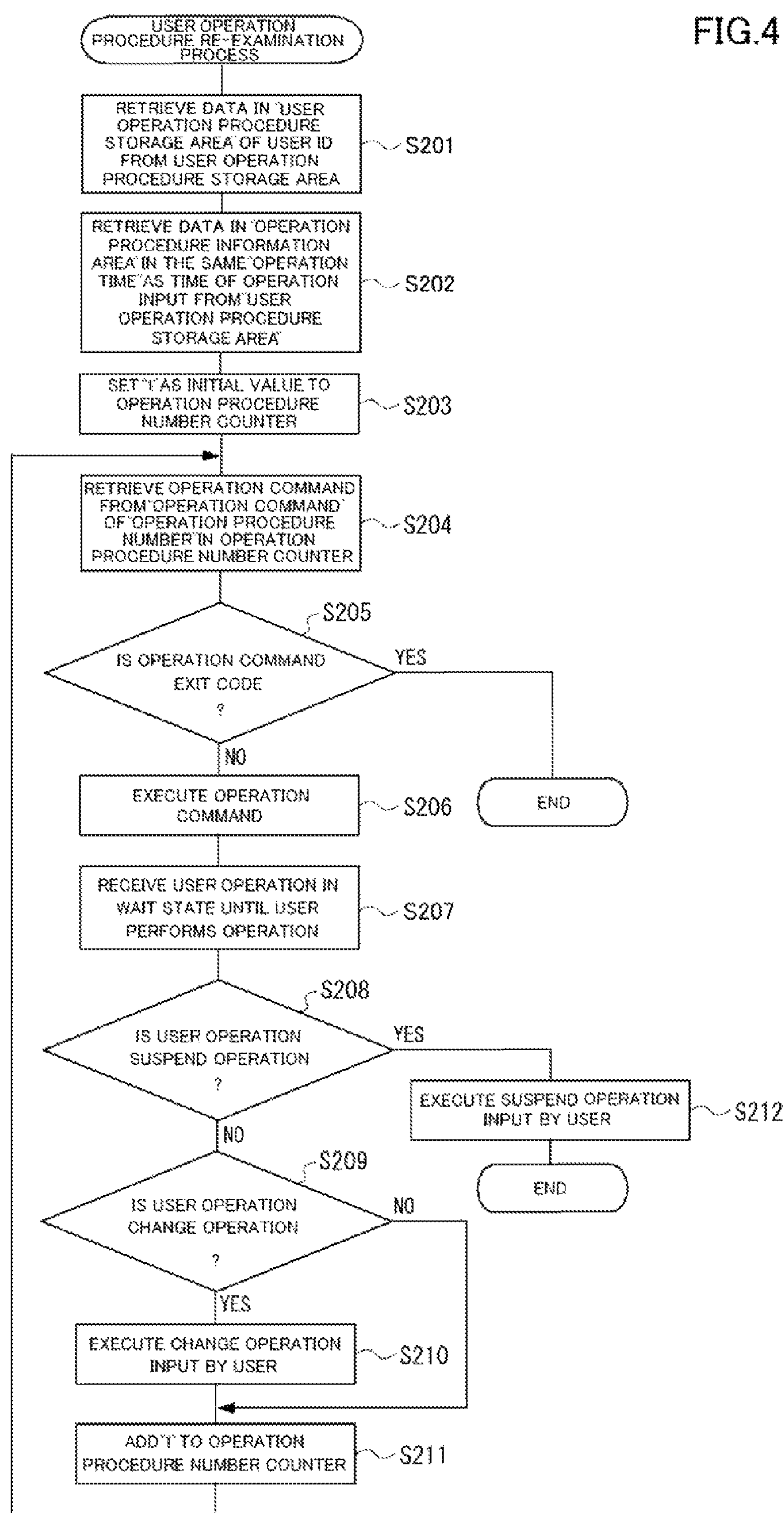
FIG.4
USER OPERATION PROCEDURE RE-EXAMINATION PROCESS
RETRIEVE DATA IN "USER OPERATION PROCEDURE STORAGE AREA" OF USER ID FROM USER OPERATION PROCEDURE STORAGE AREA
S201
RETRIEVE DATA IN "OPERATION PROCEDURE INFORMATION AREA" IN THE SAME "OPERATION TIME" AS TIME OF OPERATION INPUT FROM "USER OPERATION PROCEDURE STORAGE AREA"
S202
SET "1" AS INITIAL VALUE TO OPERATION PROCEDURE NUMBER COUNTER
S203
RETRIEVE OPERATION COMMAND FROM "OPERATION COMMAND" OF "OPERATION PROCEDURE NUMBER" IN OPERATION PROCEDURE NUMBER COUNTER
S204
S205
IS OPERATION COMMAND EXIT CODE ?
YES
NO
EXECUTE OPERATION COMMAND
S206
END
RECEIVE USER OPERATION IN WAIT STATE UNTIL USER PERFORMS OPERATION
S207
S208
IS USER OPERATION SUSPEND OPERATION ?
YES
EXECUTE SUSPEND OPERATION INPUT BY USER
S212
NO
END
S209
IS USER OPERATION CHANGE OPERATION ?
NO
YES
EXECUTE CHANGE OPERATION INPUT BY USER
S210
ADD "1" TO OPERATION PROCEDURE NUMBER COUNTER
S211

ELECTRONIC DEVICE AND RECORDING MEDIUM THAT SUPPORT OPERATION OF USERS

INCORPORATION BY REFERENCE

This application is based on and claims the benefit of priority from Japanese Patent Application No. 2014-241780 filed on Nov. 28, 2014, the entire contents of which are hereby incorporated by reference.

BACKGROUND

This disclosure relates to an electronic device and an operation support method that supports an operation of users.

Typical image forming apparatuses include printers, multifunctional printers, multifunctional peripheral devices, or multifunction peripherals. Typical image forming apparatuses can print read images of manuscript in various formats. Further, typical image forming apparatuses can simultaneously transmit images to a plurality of destinations through facsimile transmission. Furthermore, typical image forming apparatuses can display preview images on mobile terminals. Cellular phones, smartphones, tablet terminals and the like may be mentioned as the mobile terminal. Preview images are print images of images received from mobile terminals. Users who understand such operation procedure can execute various processes in typical image forming apparatuses. Users who do not understand the operation procedure, however, cannot execute desired processing. As a countermeasure for this difficulty, a help function is provided, and a simple guidance for function of typical image forming apparatus is displayed. Thereby, an operation by users is supported. For example, as a typical technique, user authentication is performed in information processing parts and programs. When performing a setting operation of a new job that has not been performed up to now by an authenticated user, if a job containing the same elements as the new job is present in other user job, individual elements (settings) of the job are displayed. Thus, the user can be supported so that the user can perform a setting operation of a new job.

SUMMARY

An electronic device according to an embodiment of the present disclosure includes a processor including one or more circuits. The processor includes a user operation procedure storage processing part that stores, for each user, a time and a procedure of operation performed by a user, and a user operation procedure re-executing part that re-executes, based on user identification information and the operation time, the operation started at the operation time by the user identified by the user identification information.

A non-transitory computer-readable recording medium according to an embodiment of the present disclosure stores an operation support program executable by a computer built-in an electronic device. The operation support program executes the computer as a user operation procedure storage processing part that, for each user, stores a time and a procedure of operation performed by a user, and a user operation procedure re-executing part that, based on user identification information and the operation time, re-executes the operation started at the operation time by the user of the user identification information.

BRIEF DESCRIPTION OF THE DRAWINGS

FIG. 3 shows steps of a user operation procedure storage processing according to Embodiment 1 of the present disclosure;

FIG. 4 shows steps of a user operation procedure re-execution processing according to Embodiment 1 of the present disclosure.

DETAILED DESCRIPTION

Hereinafter, a first embodiment (hereinbelow referred to as "Embodiment 1") will now be described with reference to the accompanying drawings. In Embodiment 1, when a user performs an operation of an image forming apparatus, an operation time at which an operation is performed formed by the user and a procedure of the operation performed at the operation time are stored, for each user. Hereinbelow, the operation of the image forming apparatus is referred to as an "image formation operation." When a user wishes to perform the same operation as that performed by other user, the time at which an operation is started by the other user is confirmed. The user performs the operation while re-executing the operation procedure started at the operation time. The operation time contains year, month, day, time, and day of week and a combination thereof. The operation time may be set as a period.

The image forming apparatus 100 in Embodiment 1 is printers, multifunctional printers, multifunctional peripheral devices, or multifunction peripherals. The image forming apparatus 100 is connected to the Internet.

Figure 1:
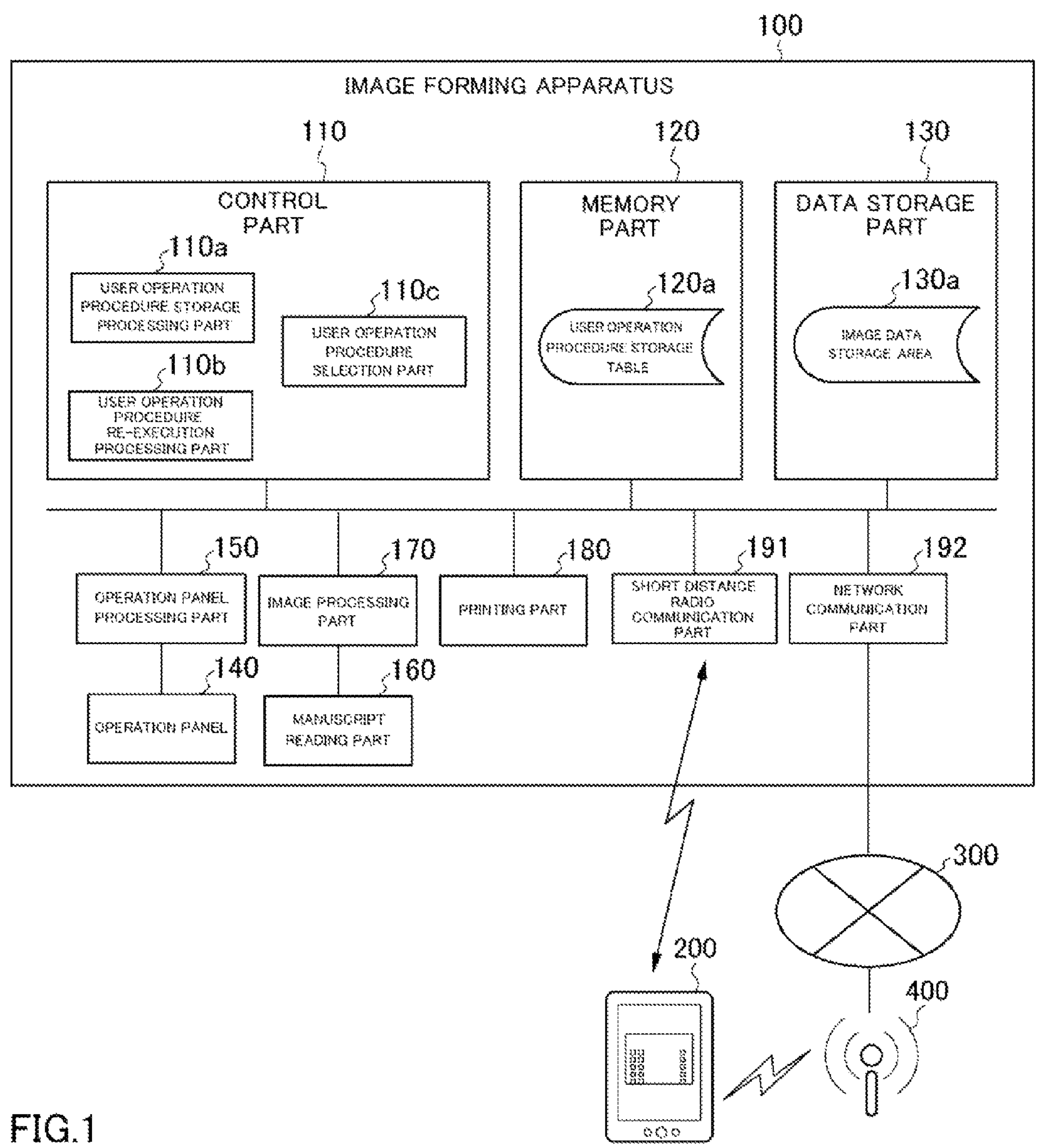
FIG. 1 shows components of an image forming apparatus according to Embodiment 1 of the present disclosure.

At the outset, the function and configuration of the image forming apparatus 100 in the Embodiment 1 will be described with reference to FIG. 1. The image forming apparatus 100 shown in FIG. 1 includes a control part 110, a memory part 120, a data storage part 130, an operation panel 140, an operation panel processing part 150, an manuscript reading part 160, an image processing part 170, a printing part 180, a short distance radio communication part 191, and a network communication part 192. These parts are connected through a bus or the like. The control part 110 includes a user operation procedure storage processing part 110*a* and a user operation procedure re-execution processing part 110*b*. The user operation procedure selection processing part 110*c* provided in the control part 110 is used in the second embodiment but is not used in Embodiment 1. A user operation procedure storage table 120*a* is provided in the memory part 120. An image data storage area 130*a* is provided in the data storage part 130.

The control part 110 includes a main storage device that is a non-transitory recording medium and a processor including an arithmetic element such as CPU (a central processing unit). The control part 110 includes various I/Os, interfaces such as USBs (universal serial buses), and a bus controller. According to this configuration, the control part 110 performs the control of overall image forming apparatus 100. The control part 110 is a processor including one or more circuits and can read and execute various programs and can also execute various programs that have been previously incorporated therein. Here the circuit may be an electronic component or an electronic substrate to which a plurality of electronic elements are connected through wiring. The control part 110, when an operation support program is executed, functions as a user operation procedure storage processing part 110*a* and a user operation procedure re-execution processing part 110*b*.

The user operation procedure storage processing part 110*a* stores information on the procedure of operation performed by a user in the user operation procedure storage table 120*a*. The details of the user operation procedure storage processing executed by the user operation procedure storage processing part 110*a* will be described later.

The user operation procedure re-execution processing part 110*b* re-executes a user ID input by the user and the operation procedure started at the operation time. The details of the user operation procedure re-execution processing executed by the user operation procedure re-execution processing part 110*b* will be described later.

The memory part 120 is an auxiliary storage device such as a flash memory. The memory part 120 has an area that stores programs and data for processing executed by the control part 110.

The user operation procedure storage table 120*a* stores the time of operation performed by the user and the procedure of operation performed by the user started at the operation time for each user. The configuration of the user operation procedure storage table 120*a* will be described later.

The data storage part 130 is a non-transitory recording medium that stores data and programs.

The image data storage area 130*a* has an area that stores images of manuscripts that have been read by the manuscript reading part 160 and processed by the image processing part 170, and images received from a mobile terminal 200 through a network communication part 192. A name is given to each of the stored image, and the stored images are identified by this name.

The operation panel 140 performs display of an operation screen and a message, display of an image, and reception of operation by the user.

The operation panel processing part 150 performs processing for display of operation items and messages corresponding to the function installed in the image forming apparatus 100. The operation panel processing part 150 performs processing for display of images on the operation panel 140. The operation panel processing part 150 performs processing for input of operation of the user from the operation panel 140.

The manuscript reading part 160 includes a scanner that reads a manuscript set on a platen in the image forming apparatus 100 when the user performs a reading operation from the operation panel 140. The manuscript reading part 160 outputs an image of a read manuscript to an image processing part 170.

The image processing part 170 includes a processor for image processing and stores the image in the image data storage area 130*a* when an image is input from the manuscript reading part 160. In this case, the image processing part 170 converts the image to a printable image or an image transmittable through a facsimile or an e-mail.

The printing part 180 is a printer that inputs an image requested for printing and prints the image, for example, on copying papers.

The short distance radio communication part 191 includes a communication interface that can transmit data to and receive data from the mobile terminal 200 through a short distance radio communication standard or an infrared communication.

The network communication part 192 includes a detachable network interface. The network communication part 192 is connected to a network 300 such as the Internet. The network communication part 192 can transmit data to and receive data from the mobile terminal 200. In this case, the mobile terminal 200 accesses an access point 400 of the network 300.

Figure 2:
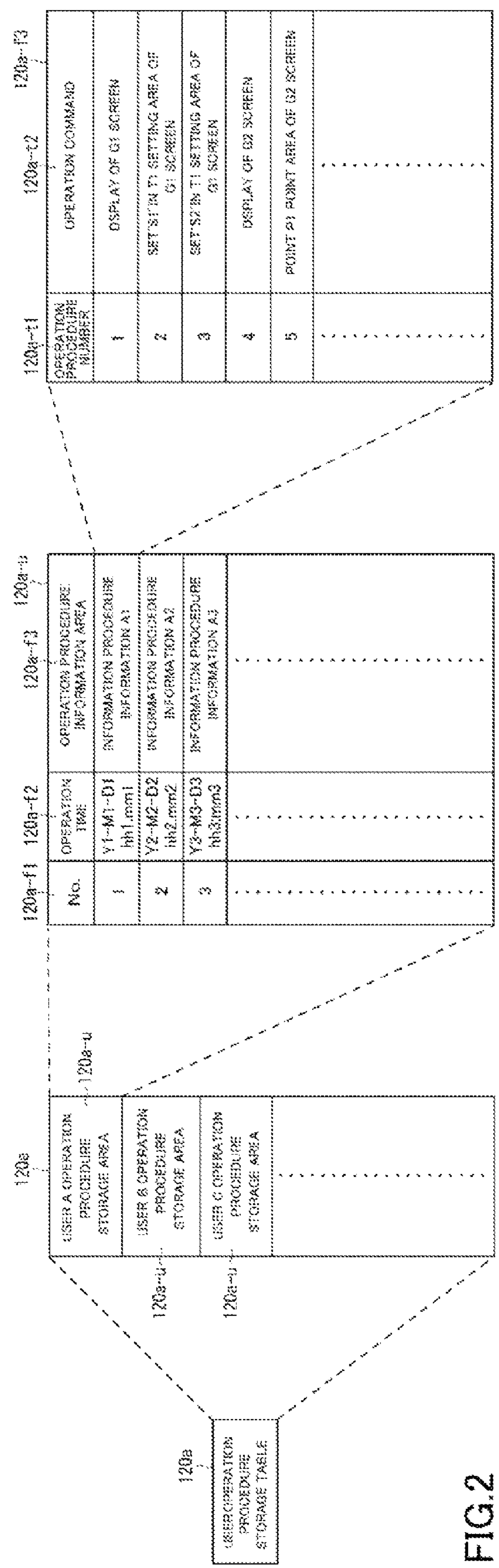
FIG. 2 shows a configuration of a user operation procedure storage table according to Embodiment 1 of the present disclosure.

Next, the configuration of the user operation procedure storage table 120*a* in the image forming apparatus 100 will be described with reference to FIG. 2. The user operation procedure storage table 120*a* is a table that stores the time of operation performed by the user and the procedure of operation performed by the user started at the operation time for each user. As shown in FIG. 2, the user operation procedure storage table 120*a* is composed of a plurality of "user operation procedure storage areas" 120*a-u*. Further, "No." 120*a-f*1 and "operation time" 120*a-f*2, and "operation procedure information area" 120*a-f*3 are provided in each of the "user operation procedure storage areas" 120*a-u*.

"No." 120*a-f*1 includes ascending unique numbers given to a series of operations that are executed by the image forming apparatus 100 through an instruction from the user.

The "operation time" 120*a-f*2 includes time and date of the series of operations performed by the user. The "operation procedure information area" 120*a-f*3 includes one or more operation commands for the series of operations performed by the user.

"Operation procedure order" 120*a-t*1 and "operation command" 120*a-t*2 are provided in the "operation procedure information area" 120*a-f*3. The "operation procedure order" 120*a-t*1 indicates an order of execution of the "operation command" 120*a-t*2 in the series of operations. In order to re-execute the operation performed by the user, the "operation command" 120*a-t*2 converts the user operation to an operation command and is then stored. For example, in the "operation command" 120*a-t*2 corresponding to "1" in the "operation procedure order" 120*a-t*1, it is described as "G1 screen display." However, it is not the case, an operation command for the execution of "G1 screen display" is stored.

Next, the details of the user operation procedure storage processing executed by the user operation procedure storage processing part 110*a* in the image forming apparatus 100 will be described. The user inputs his or her user ID from the operation panel 140. Then the operation panel processing part 150 outputs the user ID to the control part 110. When the control part 110 inputs the user ID, the user operation procedure storage processing part 110*a* is activated. When the user operation procedure storage processing part 110*a* is activated, the user operation procedure storage processing part 110*a* starts user operation procedure storage processing. User operation procedure storage processing will be described in the order of steps with reference to a flow chart shown in FIG. 3.

(Step S101)

At the outset, the user operation procedure storage processing part 110*a* retrieves data on "user operation procedure storage area" 120*a-u* corresponding to user ID from the user operation procedure storage table 120*a*.

(Step S102)

Next, the user operation procedure storage processing part 110*a* stores current date and time in the "operation time" 120*a-f*2 corresponding to "No." 120*a-f*1 next to previously stored "No." 120*a-f*1 in the "user operation procedure storage area" 120*a-u*.

(Step S103)

Next, the user operation procedure storage processing part 110*a* sets "1" as an initial value to an operation procedure number counter.

(Step S104)

Next, the user operation procedure storage processing part 110*a* enters a wait state until the user performs an operation through the operation panel 140. When the user performs an operation, the user operation procedure storage processing part 110*a* inputs user operation from the operation panel processing part 150.

(Step S105)

Next, the user operation procedure storage processing part 110*a* determines whether or not the operation input by the user is an exit operation. If the user operation is the exit operation (YES in Step S105), the process proceeds to Step S106. Otherwise, if the user operation is not the exit operation (NO in Step S105), the process proceeds to Step S107.

(Step S106)

If it is determined in Step S105 to be YES, the user operation procedure storage processing part 110*a* stores an exit code in the "operation command" 120*a*-*t*2 of the same "operation procedure number" 120*a*-*t*1 as the operation procedure number counter value in the "operation procedure information area" 120*a*-*f*3. The user operation procedure storage processing is then terminated.

(Step S107)

If it is determined in Step S105 to be NO, the user operation procedure storage processing part 110*a* converts the user operation to an operation command.

(Step S108)

Next, the user operation procedure storage processing part 110*a* stores an operation command in the "operation command" 120*a*-*t*2 of the same "operation procedure number" 120*a*-*t*1 as the operation procedure number counter value in the "operation procedure information area" 120*a*-*f*3. The "operation procedure information area" 120*a*-*f*3 is an "operation procedure information area" 120*a*-*f*3 in the "operation time" 120*a*-*f*2 stored in Step S102.

(Step S109)

Next, the user operation procedure storage processing part 110*a* adds "1" to the operation procedure number counter. The process of the user operation procedure storage processing part 110*a* returns back to Step S104.

Next, the details of the user operation procedure re-execution process executed by the user operation procedure re-execution processing part 110*b* in the image forming apparatus 100 will be described. A user inputs other user ID and operation time from the operation panel 140. This allows the operation panel processing part 150 to output the user ID and operation time to the control part 110. The control part inputs the user ID and operation time. This allows a user operation procedure re-execution processing part 110*b* to be activated. The user operation procedure re-execution processing part 110*b* is activated. This allows the user operation procedure re-execution processing part 110*b* to start user operation procedure re-execution processing. The user operation procedure re-execution processing will be described in the order of steps with reference to a flow chart shown in FIG. 4.

(Step S201)

At the outset, the user operation procedure re-execution processing part 110*b* retrieves data on a "user operation procedure storage area" 120*a*-*u* corresponding to the user ID from the user operation procedure storage table 120*a*.

(Step S202)

Next, the user operation procedure re-execution processing part 110*b* retrieves data on an "operation procedure information area" 120*a*-*f*3 of the same "operation time" 120*a*-*f*2 as the operation time input from the data in the "user operation procedure storage area" 120*a*-*u*.

(Step S203)

Next, the user operation procedure re-execution processing part 110*b* sets "1" as an initial value to the operation procedure number counter.

(Step S204)

Next, the user operation procedure re-execution processing part 110*b* retrieves an operation command from the "operation command" 120*a*-*t*2 of the same "operation procedure number" 120*a*-*t*1 as the operation procedure number counter value in the "operation procedure information area" 120*a*-*f*3.

(Step S205)

Next, the user operation procedure re-execution processing part 110*b* determines whether or not the operation command is an exit code. If the operation command is an exit code (YES in Step S205), the user operation procedure re-execution processing is terminated. Otherwise, if the operation command is not an exit code (NO in Step S205), the process proceeds to Step S206.

(Step S206)

If it is determined in Step S205 to be NO, the user operation procedure re-execution processing part 110*b* executes the operation command retrieved in Step S204.

(Step S207)

Next, the user operation procedure re-execution processing part 110*b* enters a wait state until the user performs an operation from the operation panel 140. The user operation procedure re-execution processing part 110*b*, when the user performs an operation, receives the user operation from the operation panel processing part 150.

(Step S208)

Next, the user operation procedure re-execution processing part 110*b* determines whether or not the operation input by the user is a suspend operation. If the user operation is a suspend operation (YES in Step S208), the process proceeds to Step S212. Otherwise, if the user operation is not a suspend operation (NO in Step S208), the process proceeds to Step S209. The suspend operation means an operation that suspends a re-executed operation procedure. More specifically, the suspend operation includes an operation that terminates the processing of the operation procedure during the re-execution, and an operation that instructs processing deviated from the operation procedure during the re-execution. The operation that instructs processing deviated from the operation procedure during the re-execution includes, for example, in the operation procedure corresponding to the operation procedure information A1 shown in FIG. 2, an operation that instructs display of a G2 screen or other screen without proceeding to an operation procedure number 2 during display of a G1 screen of an operation procedure number 1. Further, the operation includes, for example, an operation that executes printing without proceeding to an operation procedure number 5 during display of a G2 screen of an operation procedure number 4.

The suspend operation can allow the user to change the processing or to terminate the processing in the middle of execution of the operation procedure during the re-execution.

(Step S209)

If it is determined in Step S208 to be NO, the user operation procedure re-execution processing part 110*b* determines whether or not the operation input by the user is a change operation. If the user operation is a change operation (YES in Step S209), the process proceeds to Step S210. If the user operation is an operation that requires re-execution of a next operation rather than the change operation (NO in Step S209), the process proceeds to Step S211. The change operation means an operation that allows the user to change the set value when the operation procedure is re-executed. This is, for example, an operation that changes a collective number in collective printing. Even when the change operation is executed, processing that executes an operation command following the operation procedure is continued.

(Step S210)

If it is determined in Step S209 to be YES, the user operation procedure re-execution processing part 110*b* executes the user change operation input from the operation panel processing part 150 at Step S207. Specifically, the user operation procedure re-execution processing part 110*b* reflects, for example, a set value changed by the change operation on the image forming apparatus 100.

(Step S211)

Subsequent to Step S210, or if it is determined in Step S209 to be NO, the user operation procedure re-execution processing part 110*b* adds "1" to the operation procedure number counter. This allows the process to be returned back to Step S204.

(Step S212)

If it is determined in Step S208 to be YES, the user operation procedure re-execution processing part 110*b* executes the suspend operation. The user operation procedure re-execution processing is then terminated.

Thus, since the time and procedure of operation performed by the user are stored, if the user wishes to perform the same operation as that of other users, the IDs for the users and the time of operation performed by the other users are confirmed. When the user ID and the operation time are input from the operation panel 140, the same operation as that of the other users can be re-executed. During re-execution of the operation, when the set value or the like is changed, the change operation can be performed. Thus, in an operation by the user, when a screen to be operated, a setting value set on the screen, or the order of the operation is unknown, the operation can easily be performed according to the procedure of operation performed by the other users.

The second embodiment (hereinafter referred to as "Embodiment 2") that implements the present disclosure will be described with reference to the accompanying drawings. In Embodiment 2, when the user performs a printing operation of an image stored in the image forming apparatus, the time and procedure of the printing operation performed by the user are stored for each user. When the user wishes to perform the same printing operation as that of other users, if a plurality of other users have performed the same printing operation in the past, the time of printing operation performed by the plurality of other users is confirmed. A plurality of preview images of the results of the operation procedure of the operation time are then displayed. Only the operation procedure of a preview image selected by the user from the plurality of displayed preview images is re-executed.

The function and configuration of the image forming apparatus 100 in Embodiment 2 are the same as those in Example 1, except that a user operation procedure selection processing part 110*c* is added. An embodiment where the user operation procedure selection processing part 110*c* has been added will be described.

When the control part 110 executes an operation support program, the control part 110 is further operated as a user operation procedure selection processing part 110*c*.

Figure 5:
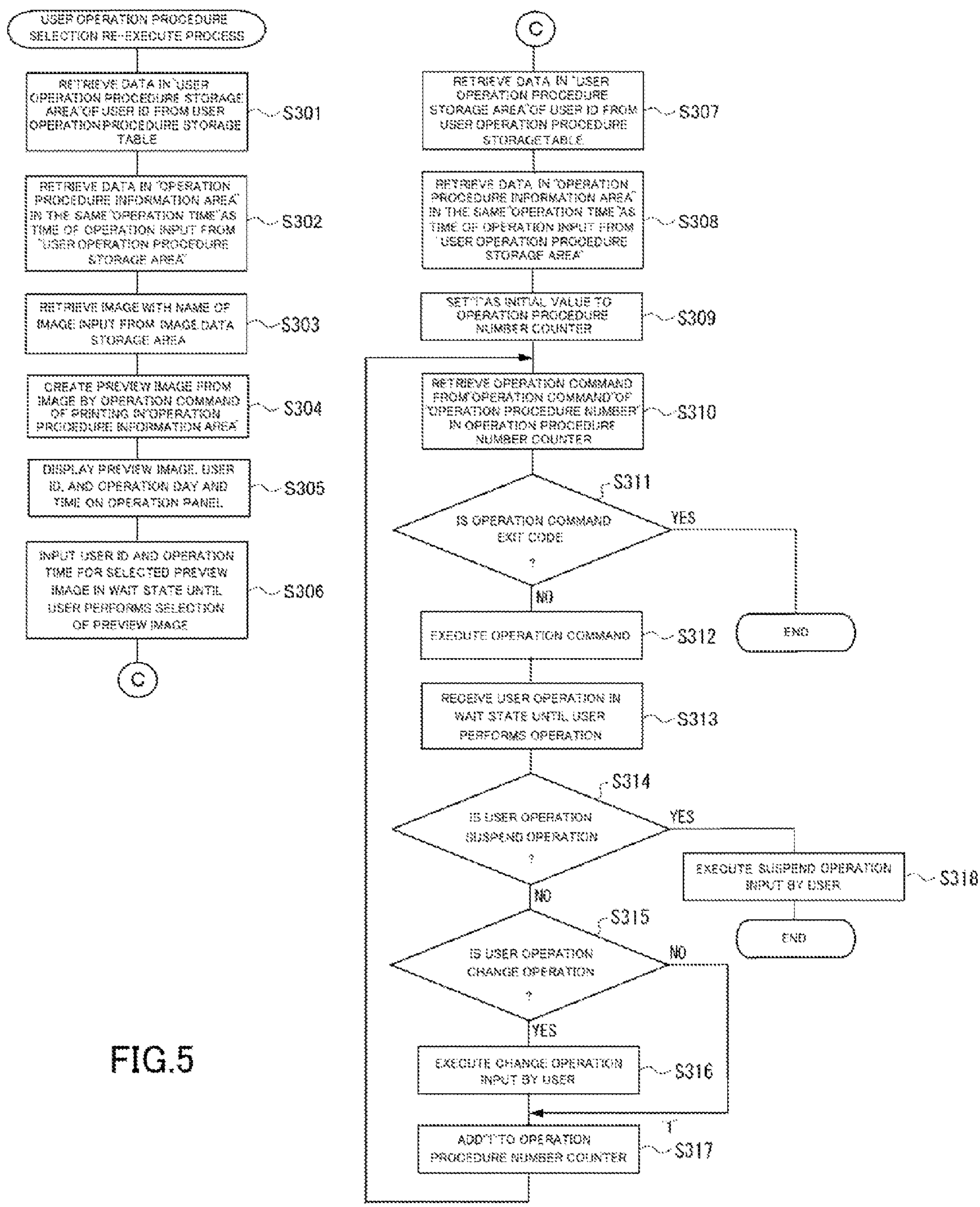
FIG. 5 shows steps of a user operation procedure selection re-execution processing according to Embodiment 2 of the present disclosure.

The details of a user operation procedure selection re-execution processing executed by the user operation procedure selection processing part 110*c* and the user operation procedure re-execution processing part 110*b* in the image forming apparatus 100 will be described. The user inputs IDs and operation times for a plurality of users from the operation panel 140 and the name of images stored in the image data storage area 130*a*. The operation panel processing part 150 outputs the IDs and operation times for the plurality of users and the name of images to the control part 110. The control part 110 inputs the IDs and operation times for the plurality of users and the name of images. The user operation procedure selection processing part 110*c* is then activated. When the user operation procedure selection processing part 110*c* is activated, the user operation procedure selection processing part 110*c* starts the user operation procedure selection re-execution processing. The user operation procedure selection re-execution processing will be described in the order of steps with reference to a flow chart shown in FIG. 5.

(Step S301)

At the outset, the user operation procedure selection processing part 110*c* retrieves a "user operation procedure storage area" 120*a-u* corresponding to the user ID from the user operation procedure storage table 120*a*. Since a plurality of user IDs are input from the operation panel 140, a plurality of data on the "user operation procedure storage area" 120*a-u* are retrieved.

(Step S302)

Next, the user operation procedure selection processing part 110*c* retrieves data on an "operation procedure information area" 120*a-f*3 of the same "operation time" 120*a-f*2 as the operation time input from the "user operation procedure storage area" 120*a-u*. Since IDs and operation times for a plurality of users are input, a plurality of data in the "operation procedure information area" 120*a-f*3 corresponding to the user IDs and the operation times are retrieved.

(Step S303)

Next, the user operation procedure selection processing part 110*c* retrieves an image with the name of the image input by the user from the image data storage area 130*a*.

(Step S304)

Next, the user operation procedure selection processing part 110*c* creates a preview image from the image retrieved in Step S303 through execution of all of operation commands of printing in the "operation procedure information area" 120*a-f*3 retrieved in Step S302.

(Step S305)

Next, the user operation procedure selection processing part 110*c* displays the preview image, and the user ID and operation time corresponding to the "operation procedure information area" 120*a-f*3 of the operation command through which the preview image has been created, on the operation panel 140. In the Step S302, a plurality of data on the "operation procedure information area" 120*a-f*3 are retrieved. This allows the plurality of preview images, the user ID, and the operation time to be displayed on the operation panel 140.

(Step S306)

Next, the user operation procedure selection processing part 110*c* enters a wait state until the user selects a preview image from the operation panel 140. When the user selects a preview image, the user ID and the operation time for the preview image are input from the operation panel processing part 150. Further, the user operation procedure selection processing part 110*c* starts the user operation procedure re-execution processing part 110*b*. The input user ID and the operation time are output to the user operation procedure re-execution processing part 110*b*. For the first time only, the user operation procedure re-execution processing part 110*b* is activated.

(Step S307)

Next, the user operation procedure re-execution processing part 110*b* retrieves data on the "user operation procedure storage area" 120*a-u* corresponding to the user ID from the user operation procedure storage table 120*a*.

(Step S308)

Next, the user operation procedure re-execution processing part 110*b* retrieves data on the "operation procedure information area" 120*a-f*3 of the same "operation time" 120*a-f*2 as the input operation time from data on the "user operation procedure storage area" 120*a-u*.

(Step S309)

Next, the user operation procedure re-execution processing part 110*b* sets "1" as an initial value to the operation procedure number counter.

(Step S310)

Next, the user operation procedure re-execution processing part 110*b* retrieves an operation command from an "operation command" 120*a-t*2 of the same "operation procedure number" 120*a-t*1 as the operation procedure number counter value in the "operation procedure information area" 120*a-f*3.

(Step S311)

Next, the user operation procedure re-execution processing part 110*b* determines whether or not the operation command is an exit code. If the operation command is an exit code (YES in Step S311), the user operation procedure re-execution processing is terminated. If the operation command is not an exit code (NO in Step S311), the process proceeds to Step S312.

(Step S312)

If it is determined in Step S311 to be NO, the user operation procedure re-execution processing part 110*b* executes the operation command retrieved in Step S310.

(Step S313)

Next, the user operation procedure re-execution processing part 110*b* enters a wait state until the user performs an operation from the operation panel 140. When the user performs an operation, the user operation from the operation panel processing part 150 is received.

(Step S314)

Next, the user operation procedure re-execution processing part 110*b* determines whether or not the operation input by the user is a suspend operation. If the user operation is a suspend operation (YES in Step S314), the process proceeds to Step S318. If the user operation is not a suspend operation (NO in Step S314), the process proceeds to Step S315. The suspend operation is an operation that suspends the re-executed operation procedure. More specifically, the suspend operation includes an operation that terminates the processing of the operation procedure during the re-execution, and an operation that instructs processing deviated from the operation procedure during the re-execution. The operation that instructs processing deviated from the operation procedure during the re-execution includes, for example, in the operation procedure corresponding to the operation procedure information A1 shown in FIG. 2, an operation that instructs display of a G2 screen or other screen without proceeding to an operation procedure number 2 during display of a G1 screen of an operation procedure number 1. Further, the operation includes, for example, an operation that executes printing without proceeding to an operation procedure number 5 during display of a G2 screen of an operation procedure number 4.

The suspend operation can allow the user to change the processing or to terminate the processing in the execution of the operation during the re-execution.

(Step S315)

If it is determined in Step S314 to be NO, the user operation procedure re-execution processing part 110*b* determines whether or not the operation input by the user is a change operation. If the user operation is a change operation (YES in Step S315), the process proceeds to Step S316. If the user operation is an operation that requires re-execution of a next operation rather than the change operation (NO in Step S315), the process proceeds to Step S317. The change operation means an operation that allows the user to change the set value when the operation procedure is re-executed. This is, for example, an operation that changes a collective number in collective printing. Even when the change operation is executed, processing that executes an operation command following the operation procedure is continued.

(Step S316)

If it is determined in Step S315 to be YES, the user operation procedure re-execution processing part 110*b* executes the user change operation input from the operation panel processing part 150 at Step S313. Specifically, the user operation procedure re-execution processing part 110*b* allows, for example, a set value changed by the change operation to be reflected on the image forming apparatus 100.

(Step S317)

Subsequent to Step S316, or it is determined in Step S315 to be NO, the user operation procedure re-execution processing part 110*b* adds "1" to the operation procedure number counter. This allows the process to be returned back to Step S204.

(Step S318)

If it is determined in Step S314 to be YES, the user operation procedure re-execution processing part 110*b* executes the suspend operation. The user operation procedure re-execution processing is then terminated.

Thus, when the user wishes to perform the same printing operation as that of other users, if a plurality of other users have performed the same printing operation in the past, the time of printing operation performed by the plurality of other users is confirmed. Further, preview images are created through the operation procedure in all the operation times and can be displayed on the operation panel 140. Further, the user can re-execute the operation procedure of printing selected from the plurality of displayed preview images. By virtue of this, even when the plurality of other users perform the same printing operation, the user can easily re-execute the operation procedure of the optimal printing.

In summary, typical information processing parts and programs can support a setting operation so as to be able to perform a new job by confirming individual elements (settings) of the displayed, but typical information processing parts and programs entail a problem that the user operation cannot be supported when a plurality of operations should be correctly performed in order.

By contrast, the present disclose provides an image forming apparatus that can provide support so that the user can perform a plurality of operations in the correct order.

In Embodiment 1 and Embodiment 2, the operation input by the user from the operation panel 140 of the image forming apparatus 100 is stored, and the operation stored in the image forming apparatus 100 is re-executed. The present disclosure, however, is not necessarily limited thereto. For example, an operation with respect to the image forming apparatus 100 is input from a mobile terminal 200 connected to an access point 400 of a network 300 and stored. Further, the operation stored in the image forming apparatus 100 can be re-executed upon request from the mobile terminal 200. Furthermore, the operation to the image forming apparatus 100 from the mobile terminal 200 connected through short distance radio communication is input and stored. Further, the operation stored in the image forming apparatus 100 can also be re-executed upon request from the mobile terminal 200.

In Embodiment 1 and Embodiment 2, examples where the operation of other users can be re-executed have been described. However, the user sometimes forgets the operation performed by the user himself or herself in the past. For this reason, the user can re-execute the operation performed by himself or herself in the past by inputting ID of the user himself or herself rather than ID of other users.

In Embodiment 1 and Embodiment 2, when the process is deviated from the operation procedure under re-examination caused by the change operation, it is also possible to output on the operation panel 140 a message informing that the process is deviated from the operation procedure. Further, it is still possible that the operation procedure can be returned back to those not yet having been performed by the user after the user operation is terminated. Furthermore, it is further possible that when the user operation is terminated, the operation procedure being stored can be compared with the operation procedure actually performed by the user. In this case, it is also feasible to display the operation not yet having been performed by the user on the operation panel 140.

Further, in Embodiment 2, the preview image in the printing operation is displayed on the operation panel 140. The present disclosure, however, is not necessarily limited thereto. For example, the preview image can also be displayed on a mobile terminal. Examples of mobile terminals include PCs (personal computers), cellular phones, smartphones, or tablet terminals connectable to the image forming apparatus 100. Further, when display of the preview image on one screen is too small to confirm the preview image, it is also possible to display the preview image on a plurality of screens.

Further, in Embodiment 2, when a plurality of other users perform the same printing operation in the past, a preview image is created by the printing operation performed by the plurality of other users and displayed on the operation panel 140. Alternatively, it is still possible that a preview image can be created by the printing operation performed by one user in the past rather than a plurality of users and displayed on the operation panel 140. In this case, it can select whether or not the printing operation is re-executed.

The image forming apparatus according to the present disclosure can provide support so that the user can correctly perform a plurality of operations in order.

While the present disclosure is described by giving specific embodiments, the embodiments are a mere illustration of the present disclosure and it is needless to say that the present disclosure is not necessarily limited to these embodiments.

As industrial applicability, the present disclosure can be applied to every apparatus that inputs user operation, and executes processing and execution based on the operation.

What is claimed is:

1. An electronic device including a processor with one or more circuits, the processor comprising:

a user operation procedure storage processing part that stores, for each user, an operation time and an operation procedure performed by a user; and a user operation procedure re-executing part that:

receives inputted identification information identifying the user and an inputted time identifying the operation time, and based on the inputted identification information and the inputted time, re-executes the operation procedure, which was started by the user identified by the inputted user identification information at the operation time identified by the inputted time, wherein the operation procedure comprises a series of operation commands, and during the re-executed operation procedure, the user operation procedure re-executing part enters a wait state, proceeds the operation procedure by one operation command to re-execute a next operation command of the operation procedure when an operation that requires to re-execute a next operation command is inputted, and executes a change of the operation procedure when an operation that requires the change of the operation procedure is inputted.

2. The electronic device according to claim 1, the processor further comprising a user operation procedure selecting part that, before re-execution of an image formation operation started at the operation time by the user identified by the user identification information, displays a preview image created by the image formation operation based on the user identification information and the operation time, and receives a selection of the preview image, wherein the operation procedure is an operation procedure of the image formation operation, and the user operation procedure re-executing part re-executes the image formation operation of the selected preview image.

3. The electronic device according to claim 2, wherein when a plurality of user identification information and operation times are input, the user operation procedure selecting part displays the preview image corresponding to a combination of the input of each user identification information and the operation time.

4. The electronic device according to claim 1, wherein the operation procedure includes an operation procedure order indicating an order of execution of an operation command in the series of operation commands and the operation command corresponding to the operation procedure order, and the user operation procedure re-executing part adds a counter value every time an operation command included in the operation procedure is re-executed, and then re-executes the operation procedure based on the operation command corresponding to the counter value of the operation procedure order.

5. A non-transitory computer-readable recording medium that stores an operation support program executable by a computer built-in in an electronic device, the operation support program causing the computer to function as:

a user operation procedure storage processing part that stores, for each user, an operation time and an operation procedure performed by a user, and a user operation procedure re-executing part that:

receives inputted identification information identifying the user and an inputted time identifying the operation time, and based on the inputted identification information and the inputted time, re-executes the operation procedure which was started by the user identified by the inputted user identification information at the operation time identified by the inputted time, wherein the operation procedure comprises a series of operation commands, and during the re-executed operation procedure, the user operation procedure re-executing part enters a wait state, proceeds the operation procedure by one operation command to re-execute a next operation command of the operation procedure when an operation that requires to re-execute a next operation command is inputted, and executes a change of the operation procedure when an operation that requires the change of the operation procedure is inputted.

6. The non-transitory computer-readable recording medium according to claim 5, wherein the operation procedure includes an operation procedure order indicating an order of execution of an operation command in the series of operation commands and the operation command corresponding to the operation procedure order, and the user operation procedure re-executing part adds a counter value every time an operation command included in the operation procedure is re-executed, and then re-executes the operation procedure based on the operation command corresponding to the counter value of the operation procedure order.

* * * * *